United States Patent [19]
Cabrera

[11] Patent Number: 5,813,629
[45] Date of Patent: Sep. 29, 1998

[54] AIRPLANE STRETCHER SYSTEM

[76] Inventor: Carlos Parra Cabrera, Dali 5, Comunidad, Villacana, 29689 Cancelado-Estepona (Malaga), Spain

[21] Appl. No.: 631,734

[22] Filed: Apr. 10, 1996

[51] Int. Cl.⁶ ....................................... B64D 11/00
[52] U.S. Cl. ................................ 244/118.6; 244/118.5; 244/137.2; 5/626; 296/19
[58] Field of Search .............................. 244/118.6, 118.5, 244/137.2, 137.1; 5/625, 626; 403/99, 364; 296/19

[56] References Cited

U.S. PATENT DOCUMENTS

| | | | |
|---|---|---|---|
| 2,605,912 | 8/1952 | Small et al. | 296/19 |
| 2,959,924 | 11/1960 | Groetschel | 403/79 |
| 4,457,649 | 7/1984 | Vogg et al. | 244/137.1 |
| 4,684,280 | 8/1987 | Dirkin et al. | 403/79 |
| 4,808,023 | 2/1989 | Arnold et al. | 403/79 |
| 5,564,654 | 10/1996 | Nordstrom | 244/137.1 |

FOREIGN PATENT DOCUMENTS

| | | | |
|---|---|---|---|
| 117 | 1/1915 | United Kingdom | 296/19 |
| 504951 | 5/1939 | United Kingdom | 296/19 |
| 806600 | 12/1959 | United Kingdom | 5/626 |

*Primary Examiner*—Robert J. Oberleitner
*Assistant Examiner*—Tien Dinh
*Attorney, Agent, or Firm*—Thomas A. O'Rourke

[57] ABSTRACT

An improved stretcher system is disclosed. The stretcher system has a first horizontal stretcher support member having a first end and a second end and a vertical stretcher support member having a first end and a second end. The first end of the horizontal stretcher support member is removably connected to a wall surface. The second end of the horizontal stretcher support member is connected to the first end of the vertical stretcher support member. The second end of the vertical stretcher support member is removably connected to a floor surface. Also disclosed is a second horizontal stretcher support member having a first end and a second end and a second vertical stretcher support member having a first end and a second end. The first end of the second horizontal stretcher support member is also removably connected to the wall surface, the second end of the second horizontal stretcher support member is connected to the first end of the second vertical stretcher support member. The second end of the vertical stretcher support member is removably connected to a floor surface.

There is also disclosed a stretcher removably connected to the first and second horizontal stretcher support members.

14 Claims, 8 Drawing Sheets

AIRPLANE STRETCHER SYSTEM

Competition in the airline industry particularly after government deregulation in the late 1970's has caused airlines to attempt to reduce cost and maximize profits as much as possible. As a result, airlines frequently attempt to have the plane filled with as may seats as possible to increase the number of travellers and therefore revenue on a given flight. As the number of seats increase the amount of storage room on the plane decreases. As a result, airlines must use all available room as best as possible. In addition, if the plane on a scheduled flight is not close to being full, some airlines change the type of equipment being used to a smaller plane in an attempt to maximize revenue. As a result, the number of unused seats available in any given airplane for storage is usually at a minimum. Storage areas on airplanes also decrease as the airlines increase the number of seats. No longer do airlines have adequate room to store garment bags and other luggage on board in the main cabin.

Commercial air travel has expanded greatly in recent years. Not only are people travelling further from home they are also travelling for longer periods. In addition, the increase in reduced airfares has made air travel more available for greater numbers of the general public. With the growth in air travel there has also been an increase in the number of travellers that incur injury or illness while travelling. Many travellers are not content with passive tourist activities and are involved in heavy physical activity while travelling. As people travel to more exotic and/or remote destinations they are also travelling to areas where the health care is not up to the standards that they have grown accustomed to. As a result, when travellers become ill or injured on these trips many prefer to be transported by airline to hospitals closer to home, to his or her personal physician or at least to a major urban area where health care may theoretically be better. Consequently, there is a need for a stretcher and system for using the stretcher on aircraft and for a means for conveniently storing the system when not in use.

In order for a stretcher system to be used on an aircraft it is necessary that the stretcher system be lightweight yet strong enough to satisfy any Federal Aviation Administration or other requirements governing aircraft equipment and its use. While an ordinary stretcher may be used for transporting patients, traditional stretchers are not especially adapted for use and storage on airplanes. Stretchers also are particularly long and bulky and a fixed stretcher system on a plane takes up unnecessarily large amounts of space that could otherwise go to revenue paying passengers. In view of the need for airlines to have as much storage space available for the passengers and their belongings, commercial airlines do not have large areas of vacant space to permit a stretcher to be conveniently stored when not in use. In addition, while medical emergencies are not infrequent on flights, they do not occur regularly or predictably. As a result, airline executives have a dilemma that is difficult to resolve. Do they equip the plane with a stretcher for medical emergencies or do they hope that problems will not arise while in flight and, thus choose not to equip the plane with a means for transporting patients.

Another factor in these considerations is that commercial stretchers are not designed for convenient airplane use and storage so that it is difficult to secure the stretcher to the cabin of the aircraft when needed so that the patient is secure and not further injured during the take off and landing of the airplane. In addition, airplane travel is not always velvety smooth. Most trips are punctuated with at least some turbulence, frequently, in stormy weather. Thus, there can be bouts of severe turbulence that could cause undesirable movement of the patient that could place stresses on ordinary stretchers that are not adapted for use on aircraft. Thus, properly and safely fastening the stretcher to the plane is also necessary to prevent injury during flight turbulence.

In applicant's U.S. Pat. No. 5,259,575, the disclosure of which is incorporated by reference herein, there is described a stretcher system that provides the patient with the proper support and restraint yet also provides a system that can be unobtrusively stored in the confines of a commercial or military airplane, train or bus. Specifically, the stretcher system of U.S. Pat. No. 5,259,575 may be stored in an unopened position along the wall of the airplane. The stretcher is designed so that the stretcher may be pulled down from its storage position as needed. This is accomplished by having one side of the stretcher hingedly connected to the wall of the airplane. The stretcher is designed and shaped so that its stored position conforms to the inside wall of the plane and does not create undesirable seating when it is in a stored or in an unused position.

Another approach to airplane stretcher systems is disclosed in U.S. Pat. No. 4,115,884 to Keogh. Disclosed in Keogh is a support structure for a removable stretcher which is adapted to be placed on an assembly which is anchored to the plane. The stretcher of Keogh is an ordinary stretcher with a tubular frame that has a fabric material in its center to provide cushioning for the patient. Straps are provided to hold the patient down during flight.

The Keogh stretcher is placed on a specially designed table which is provided with upwardly facing hooks that will receive the tubular stretcher frame and lock it into place. The table has two pairs of legs which are adapted to be anchored to the anchoring means on the floor of the plane which holds the seat in place. The table is further secured by straps which also convert the table to the seat anchoring system of the airplane.

One of the problems not addressed by Keogh is the storage of the stretcher support when not in use. Keogh is not concerned with this problem at all and in fact Keogh appears to contemplate that the stretcher support would be removed from the airplane and not stored thereon.

In addition to the need for a stretcher in commercial airplanes, stretchers also have application in military air transports where there is a critical necessity for the wounded and the injured to be taken to a medial facility as promptly as possible. This requirement is not recognized by the Keogh patent.

Many times when patients are being transported by airplane from one location to another the patient is initially taken to the airport in an ambulance or other vehicle when going to the airport the patient is usually positioned on a stretcher. In the present invention the patient already in place on a stretcher may be brought onto the plane while on the stretcher and the stretcher may be secured to the airplane for the flight.

OBJECTS OF THE INVENTION

It is an object of the present invention to provide an improved airplane stretcher system including support frame that can be readily installed in an airplane by ordinary airline personnel without the need for complex tools and without major changes in the seating configuration on the airplane.

It is also an object of the present invention to provide a stretcher system that can be readily disassembled and conveniently stored on an airplane when not being used without taking up room unnecessary room in the passenger cabin.

It is another object of the present invention to provide a portable stretcher system that is strong enough to prevent further passenger injury during turbulent flights and which will also pass regulatory approval governing the strength of equipment used on airplanes.

It is a further object of the present invention to provide a stretcher system that can be employed with a variety of stretchers and a variety of airplane types.

SUMMARY OF THE INVENTION

The present invention is directed to an improved stretcher system including support frame for use on airplanes. This invention can also be used on other modes of transportation if desired such as trains, buses and helicopters. In addition, the invention can be used by both civilian and military aircraft.

The improved stretcher system has a plurality of supports that support and retain the stretcher. Each support has a generally vertical leg which is capable of being anchored at one of its ends to the floor of an airplane, usually in the same location where the seats are anchored to the floor. At the opposite end of the vertical member there is a generally horizontal arm that is connected thereto and which extends from the vertical leg to the wall of the airplane. The horizontal arm or member is hingedly connected to the end of the vertical leg or member. The opposite end of the horizontal member is preferably removably connected to the inner wall of the airplane fuselage by a suitable means.

There are preferably two to three such supports for the stretcher although additional supports are possible as desired. There is usually one support each in the general area of the head and foot of the stretcher to support the feet of the patient and the head of the patient. There is preferably another support in generally the center of the stretcher to provide further support. It will be appreciated that fewer or more supports can be employed as desired. The stretcher usually, the underside thereof, is provided with a means for securing the stretcher to the support members.

When needed by the airline personnel the support members of the present invention can be readily assembled without complex tools and equipment and without a major reconfiguration of the seating in the aircraft. When not in use the supports can fold up and stored in a minimum of space on the aircraft.

DETAILED DESCRIPTION OF THE INVENTION

Figure 1:
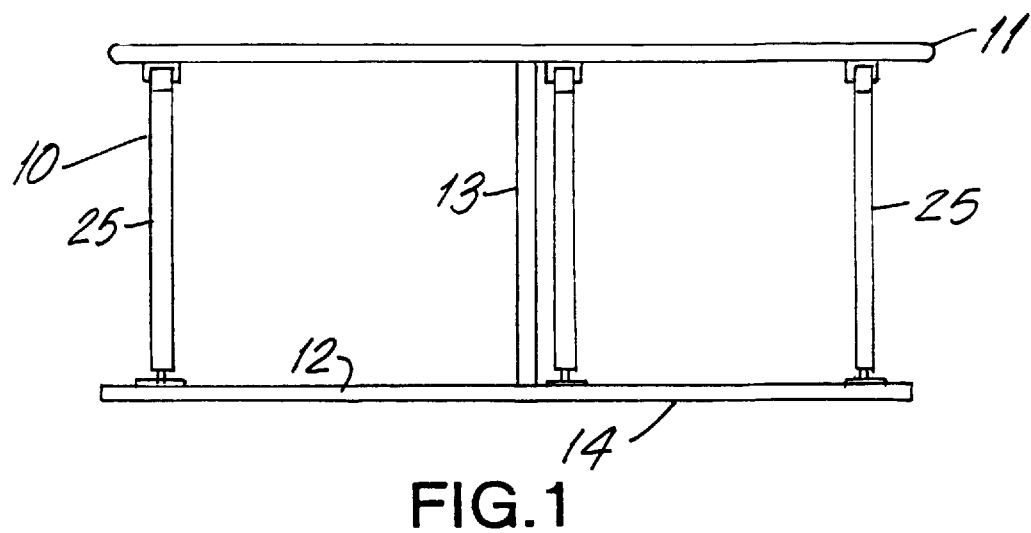
FIG. 1 is a side view of the stretcher system of the present invention.
Figure 2:
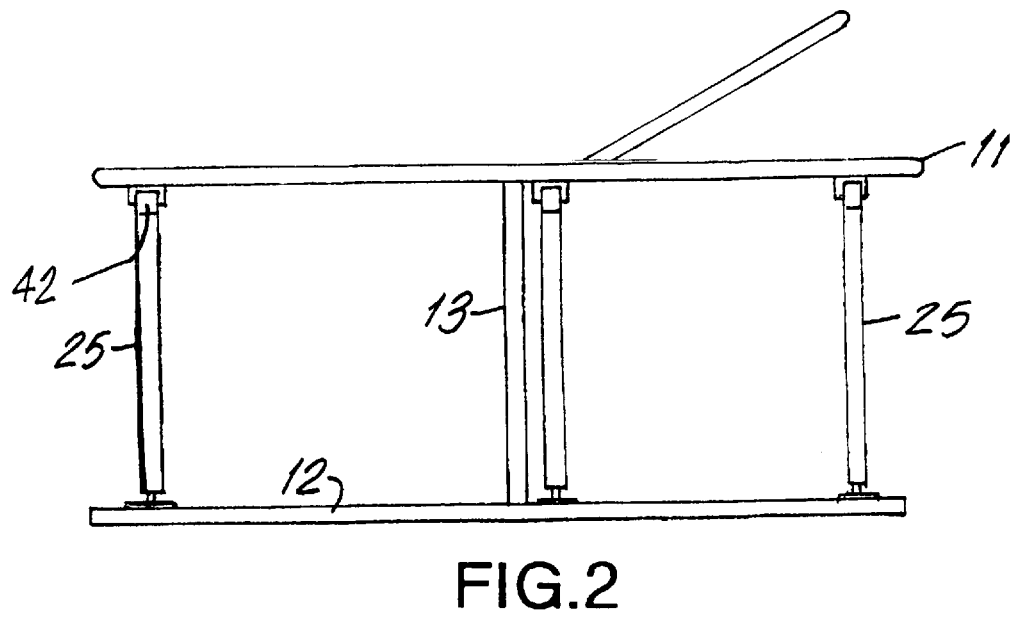
FIG. 2 is a side view of the stretcher system of the present invention with the head section of the stretcher partially raised.
Figure 3:
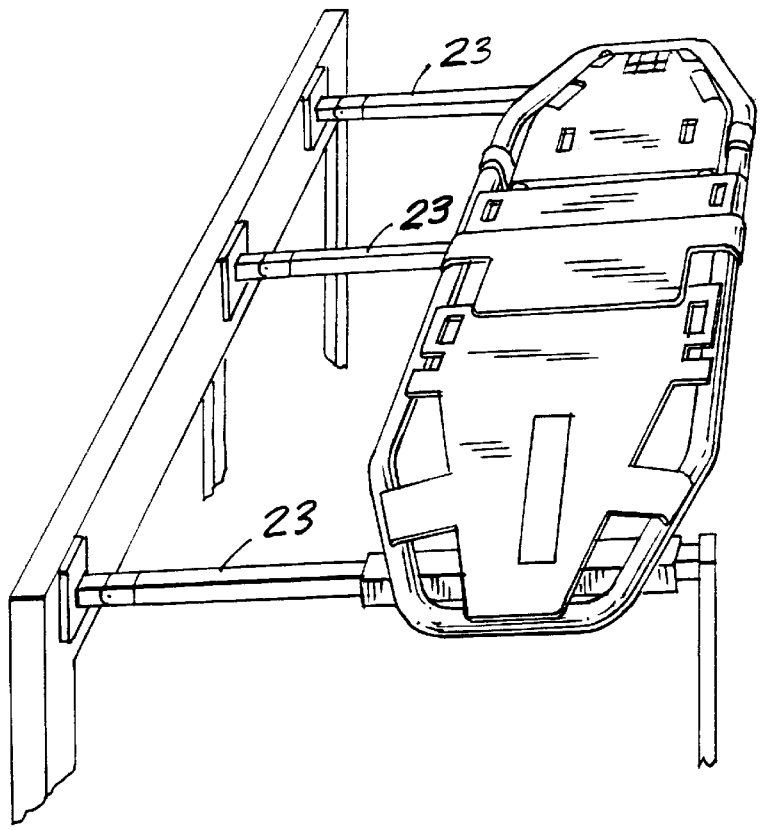
FIG. 3 is a partial end view of the stretcher system of the present invention with the foot section of the stretcher in the foreground.
Figure 4:
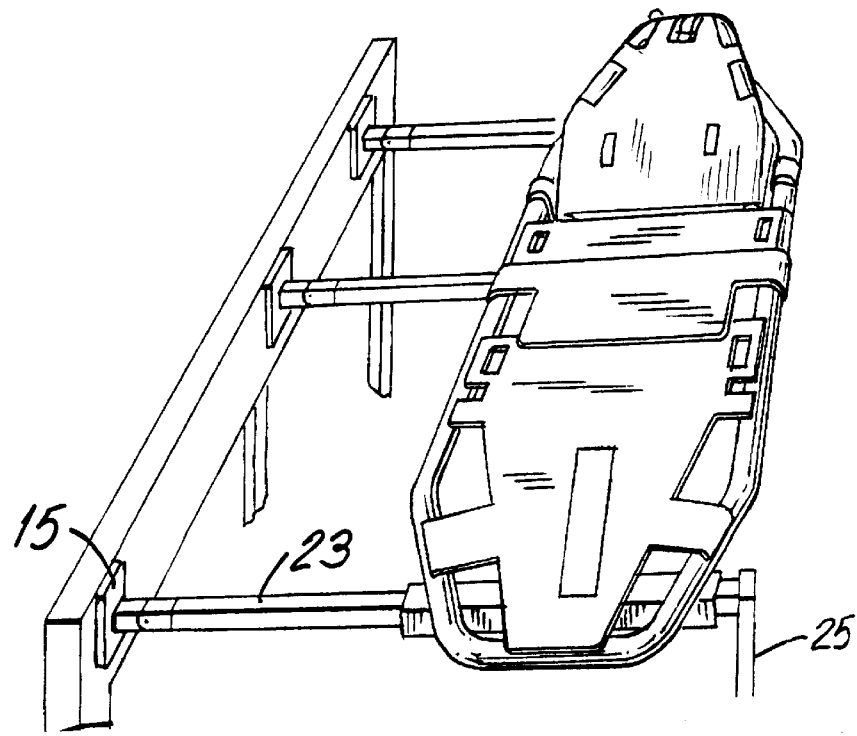
FIG. 4 is an end view of the present invention taken from the foot end with the head section partially raised.
Figure 5:
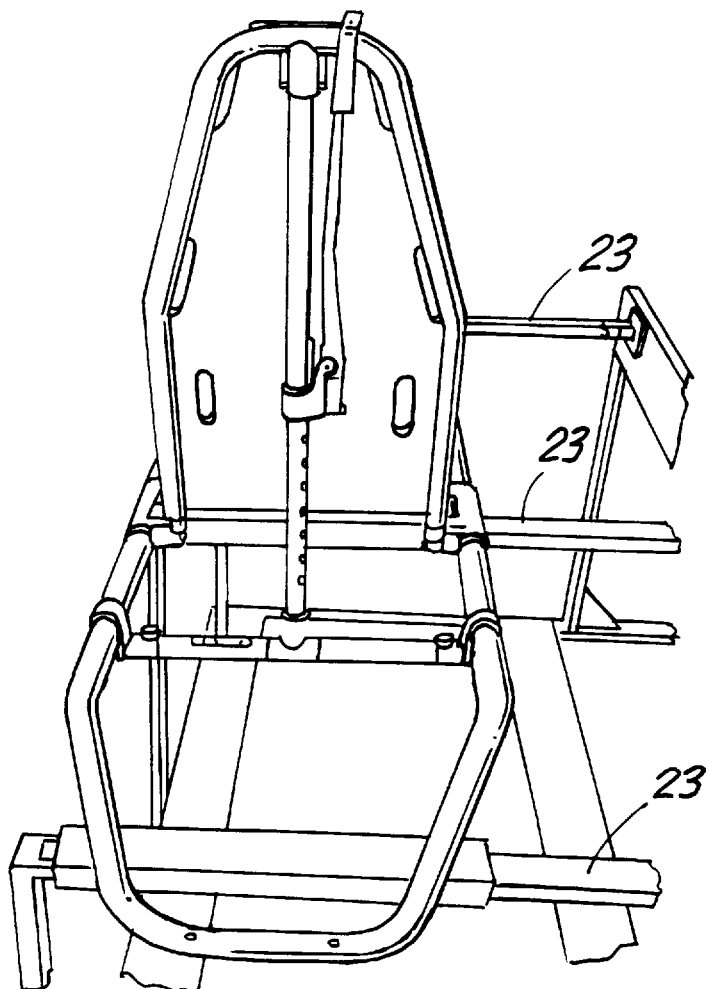
FIG. 5 is an end view of the stretcher of the present invention taken from the head end with the head support section fully raised.
Figure 6:
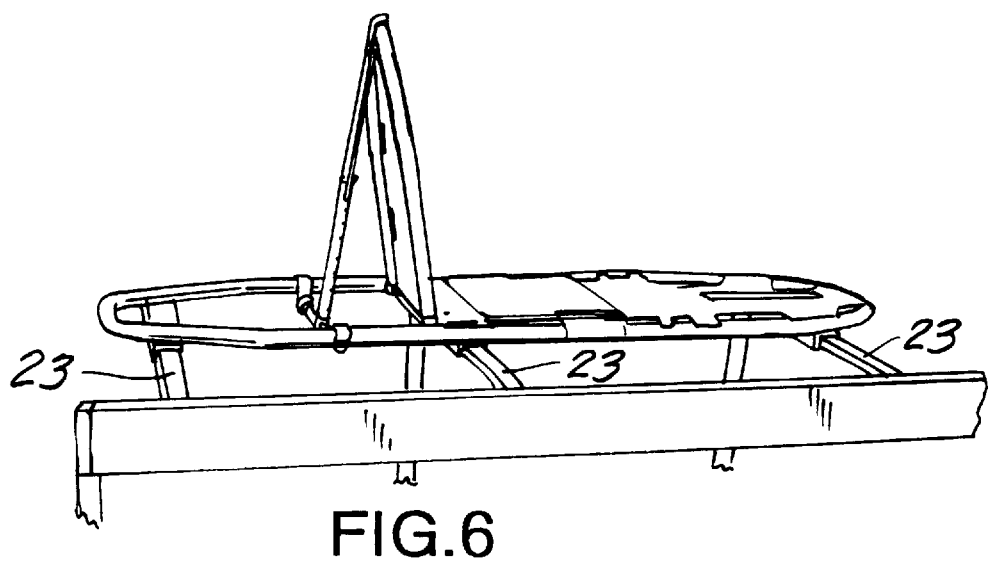
FIG. 6 is a side view of the stretcher of FIG. 5 as viewed from the wall of the plane with the head support section fully raised.
Figure 7:
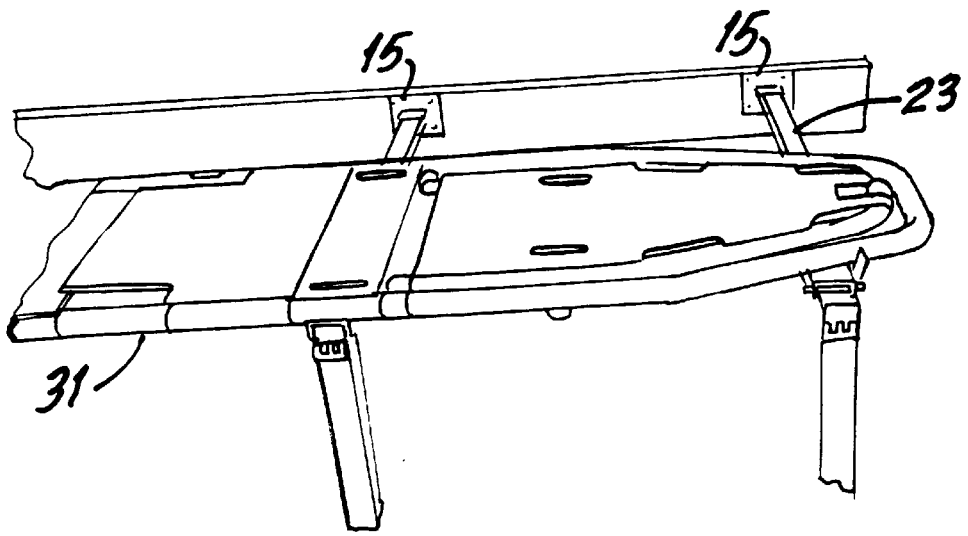
FIG. 7 is a partial side view of the head end of the stretcher system.
Figure 8:
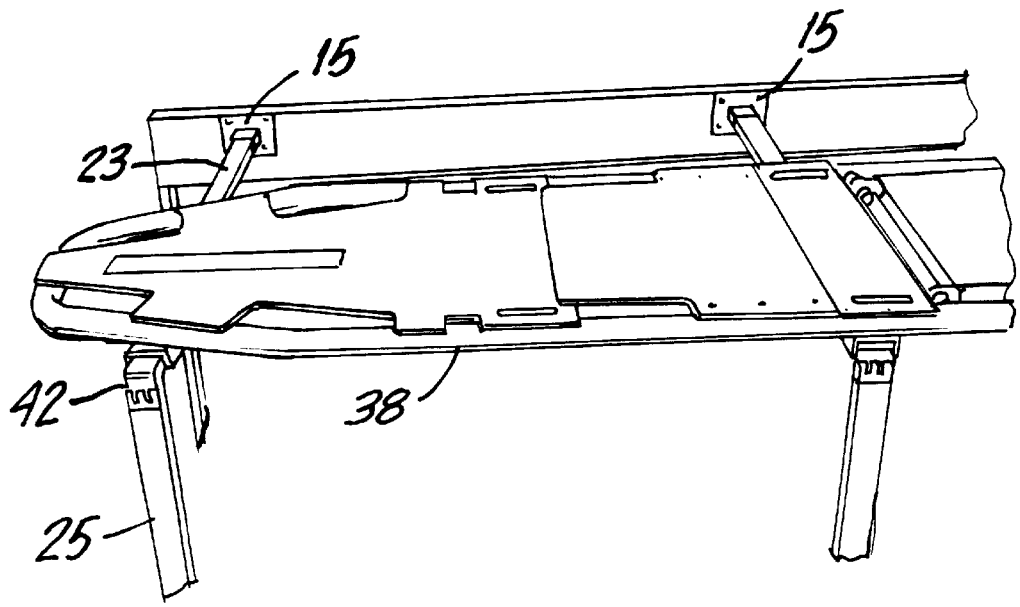
FIG. 8 is a partial side view of the foot end of the stretcher system.

As shown in FIG. 1 there is a stretcher assembly 10 with a stretcher 11 in place. The stretcher system of FIG. 1 is shown on a frame 12 for illustration purposes. The frame 12 has a side support 13 and a base 14 which represent for illustration purposes only the floor side wall and the floor of an airplane fuselage respectively. When not in use, the stretcher assembly may be stored in any suitable location on the plane where it can be readily accessed as the need arises. In use, one or more of the airplane seats may be removed from an aircraft for placement of the stretcher assembly. Preferably, the seats that are adjacent to the wall of the airplane are the most suitable for removable as it will permit one side of the stretcher assembly to be anchored to the wall. Alternatively, the seats may remain in place and only the backs of the seats need to be removed or lowered out of the way.

Figure 10:
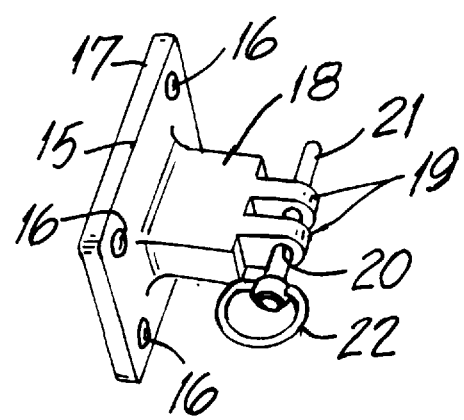
FIG. 10 is a view of the means for attaching the horizontal stretcher support member to the interior wall of the airplane.

Attached to the wall of the plane, usually permanently, are a plurality of anchors 15 which are aligned along the wall generally in the same horizontal plane. This will permit the stretcher assembly to be generally level when a stretcher is in place. Alternatively, the anchors may be attached to one of the bulkhead walls if desired. In some instances, however, bulkhead walls may not necessarily have sufficient strength to support the stretcher system in all instances. As shown in more detail in FIG. 10, these anchors preferably have a plurality of fasteners 16 mounting the anchor 15 to the wall of the fuselage. At about the center of the anchor plate 17 a stem 18 extends outwardly into the interior of the airplane from the anchor. Stem 18 may be integral with anchor plate 17 or may be attached thereto by any suitable means such as welding. In FIG. 10, the stem 18 is shown generally rectangular in cross section with the longer two sides of the rectangle being the upper surface and the shorter of the two sides being the side surfaces. Other configurations of the cross section are also possible such as square or round. Stem 18 ends in a plurality of spaced apart holed members or fingers 19, usually at least two, extending outwardly from the stem.

The two holed members 19 are separated from each other by a distance "x" which is similar to the width "y" of each of the holed members 19. The holed members 19 extend outwardly from the stem 18 and preferably have a generally arcuate outer circumference or surface on the portion of the holed member 19 that is opposite the connection of the holed member to the stem 18. Orifice or hole 20 is adapted to receive a pin 21. Pin 21 is preferably provided with a ring 22 at the head end to permit easy removal of the pin during assembly and disassembly of the stretcher assembly.

Figure 11:
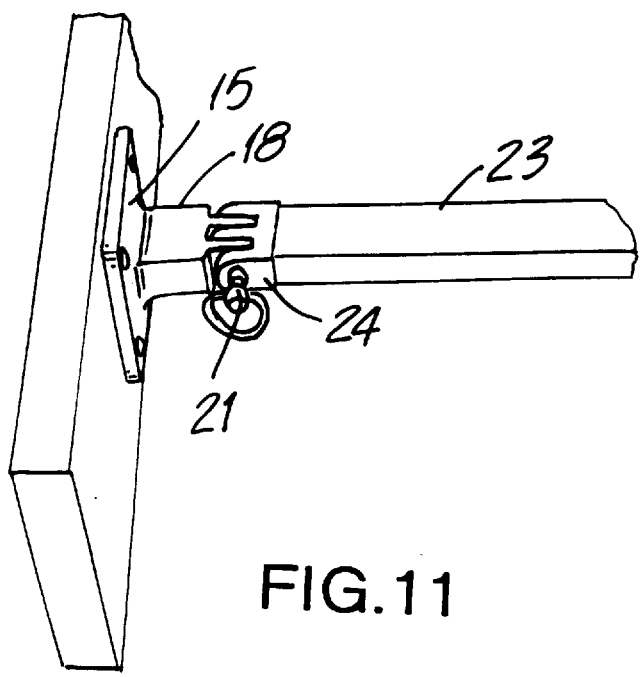
FIG. 11 is the horizontal support member connected to the means of FIG. 10.

Extending from stem 18 is a horizontal stretcher support member or arm 23. At the end of the horizontal stretcher support member 23 adjacent the stem 18, there is provided one or more holed members 24. If more than one holed member 24 is present on the horizontal stretcher support member 23 these members are spaced apart generally by the distance "y" which corresponds to the width of holed member 19. The width "x" of each holed member 24 corresponds to the width "x" of the space between holed members 19. As in the case of holed members 19, holed members 24 are also generally arcuate in a portion of their outer circumference specifically the portion that is adjacent the stem 18 when the horizontal stretcher support member 23 is connected to the stem 18. Holed members 19 and 24 mate as more clearly shown in FIG. 11 so that pin 21 passes through the holed members thereby locking the horizontal stretcher support member 23 to the stem of the anchor 15. When pin 21 passes through the holed members the horizontal stretcher support member 23 is thus hingedly connected to the stem to permit some rotational movement of the generally horizontal stretcher support member 23 about the axis of the pin 21. The ability of the horizontal stretcher support member 23 to move rotationally about the pin 21 permits the stretcher system of the present invention to be used in a variety of aircraft where the height of the anchors from floor is not uniform. As a result, the horizontal stretcher support members 23 while generally horizontal to the floor will not necessarily always be parallel to the floor as they extend outwardly from the wall of the aircraft into the seating area and may have some slight angle from the horizontal plane of the floor. Holed members 24 may be formed on horizontal stretcher support member 23 by any suitable means. Alternatively they may be formed as a separate unit and attached to stretcher support member 23.

Figure 9:
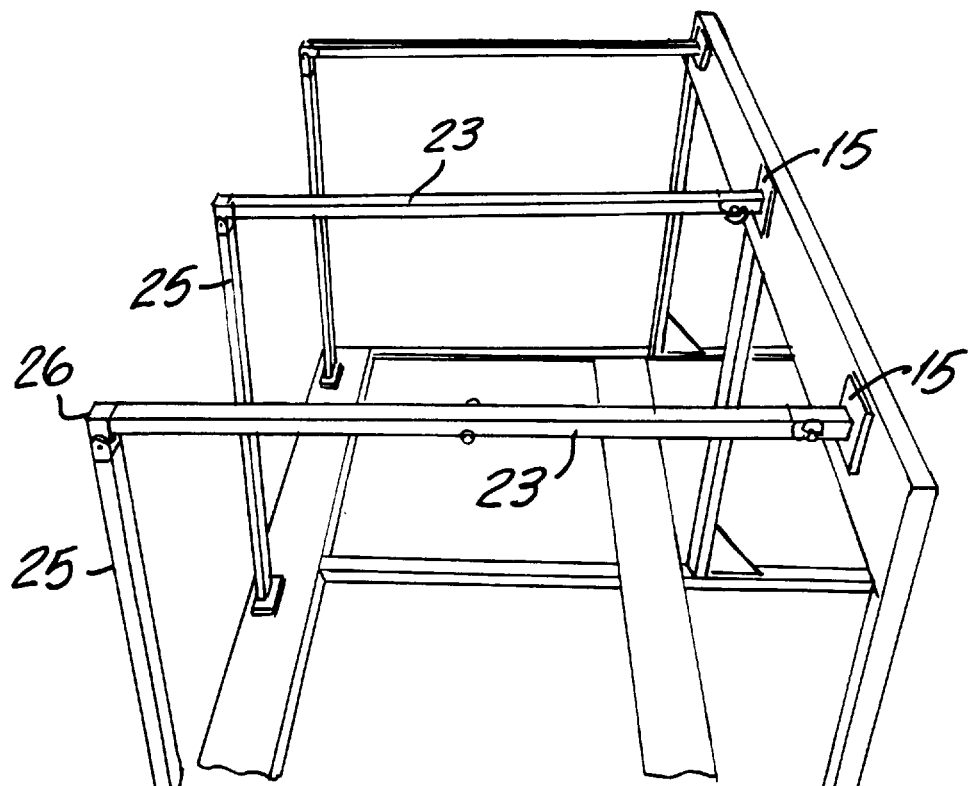
FIG. 9 is a side view of the horizontal stretcher support member.

The horizontal stretcher support member 23 is preferably rectangular in cross section as seen, for example, in FIG. 9. other cross sections are possible, however. A generally square or rectangular cross section permits the stretcher support members to be readily folded together for storage.

At the end of the horizontal stretcher support member 23 opposite the holed members 24 the horizontal stretcher support member is hingedly connected to vertical stretcher support member 25 by a hinge 26. Vertical stretcher support member 25 is preferably rectangular in cross section and similar in shape and cross sectional dimensions to the horizontal stretcher support member 23. Both support members may be made out of any suitable material such as metal or plastic. One suitable material is a strong light weight metal such as aluminum. One preferred metal is Duraluminum alloy. The vertical stretcher support member 25 may be joined to the horizontal stretcher member 23 by any suitable means. Preferably, they are hingedly connected although they do not have to be. In a preferred embodiment the vertical stretcher support member 25 and horizontal stretcher support member 23 can have on their ends which join an arrangement of holed members 42 similar to the connection of the horizontal stretcher support 23 to the stem 18. The pin joining the vertical and horizontal stretcher support members may be removable as is pin 20 or permanent. At the end of the vertical stretcher support member 25 opposite the end connected to the horizontal stretcher support member 23 there is a means for connecting the vertical support to the floor of the airplane.

Figure 14:
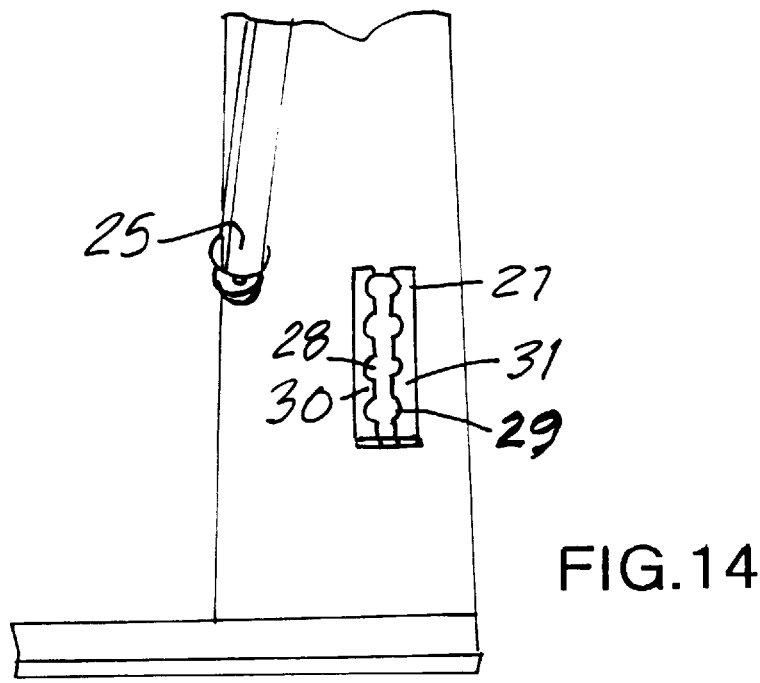
FIG. 14 is a top view of the means for securing the vertical stretcher support member to the floor of an airplane.
Figure 16:
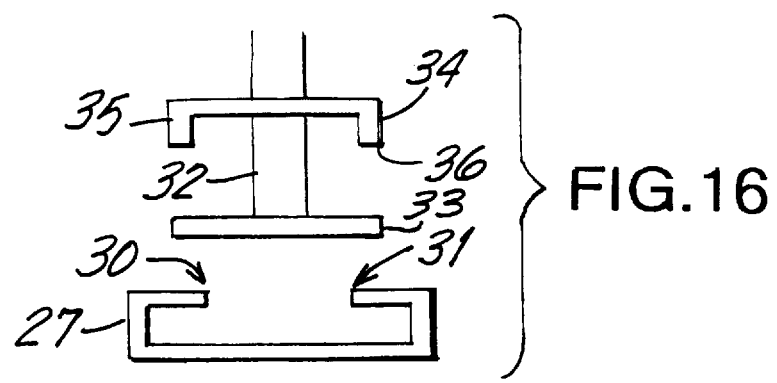
FIG. 16 is a side cross sectional view of the metal strip on the floor of the airplane used to anchor the stretcher support system of the present invention.
Figure 15:
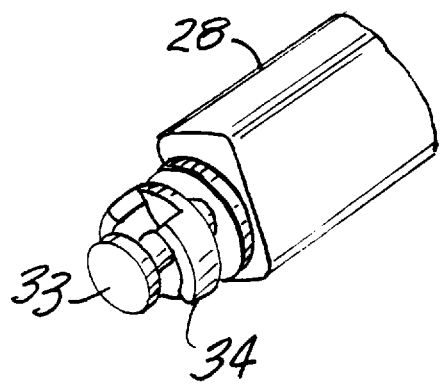
FIG. 15 is a side planar view of the end of the vertical stretcher support member which locks into the means of FIG. 14.

As shown in FIG. 14 a preferred means of connecting the vertical stretcher support member to the floor of the airplane employs a metal strip 27 extending along the floor of the airplane and firmly attached thereto. The metal strip may be of any length along the floor to give airline personnel the option of a number of locations on the floor to set up the stretcher system The metal strip 27 has a plurality of orifices 28 and 29. The orifices 28 and 29 in the metal strip are separated by a pair of flanges 30 and 31 that extend toward the center axis of the strip. The flanges 30 and 31 do not extend all the way down to the interior surface of the strip and their underside is open as seen in FIG. 16. The orifices 28 and 29 may be round or any other convenient shape.

The end of the vertical stretcher support member 25 has a stem 32 which extends from the support member. Attached to the stem is a disc 33 at the tip of the stem. The disc has a diameter slightly less than the diameter of the orifices 28 and 29. When the disk 33 is inserted into an orifice, the vertical stretcher support 25 is moved so that the disk is under the adjacent pair of flanges 30 and 31 with the stem 32 in the gap between the two flanges. Locking member 34 is then lowered over the flanges 30 and 31. Locking member 34 also has a pair of flanges, 35 and 36 extending downwardly which fit over the exposed parts of the disc 33. A suitable nut 37 or other fastener can be used to hold the locking member in place by being, for example, screwed down over the locking member.

Figure 12:
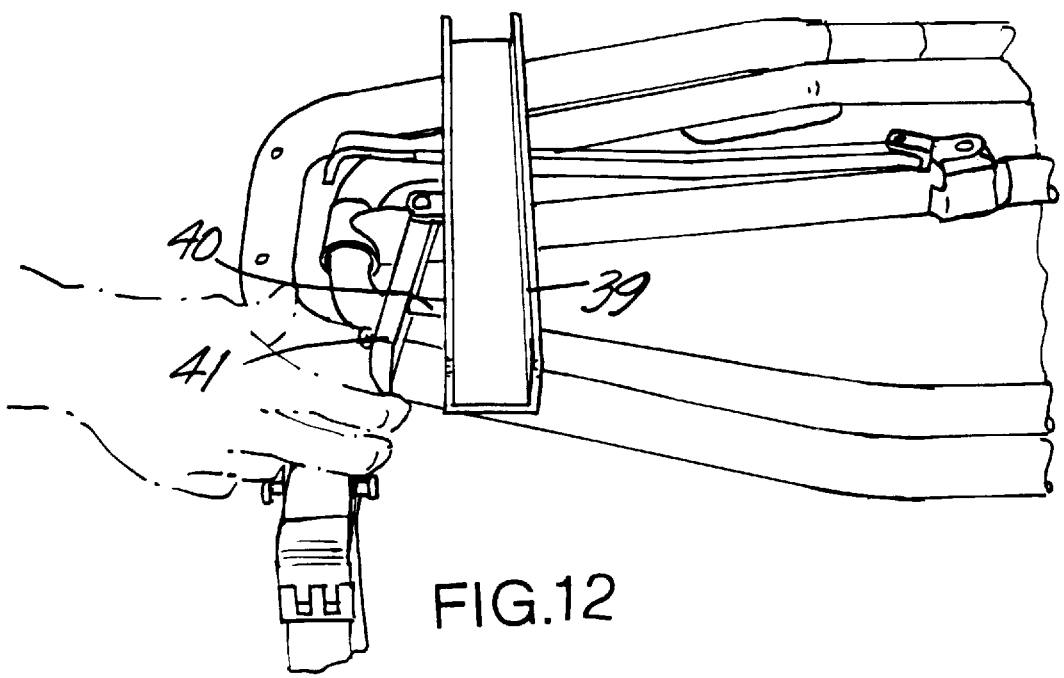
FIG. 12 is a partial underside view of the locking mechanism for locking the stretcher to the horizontal stretcher support member.
Figure 13:
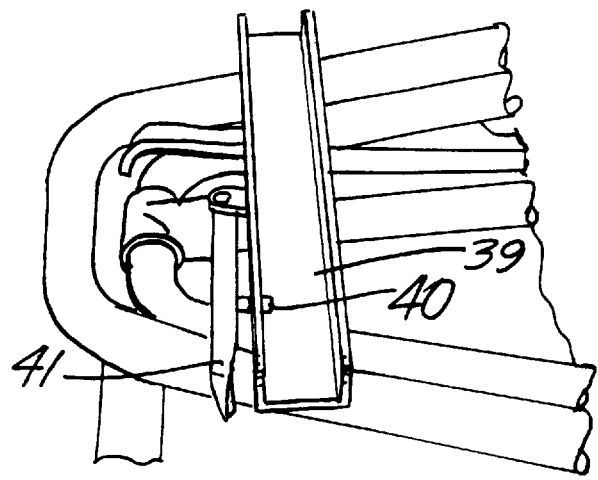
FIG. 13 is a partial underside view of the locking mechanism of FIG. 11 where the mechanism is in a locked position.

A stretcher 38 is placed over horizontal stretcher support members 23. As shown in FIG. 12 the underside of the stretcher 38 is provided with a plurality channel 39 which are designed to extend over the horizontal support members 23. The channels are generally "U" shaped in cross section and are at two or more locations on the underside of the stretcher. Preferably the channels are at the head and the foot of the underside of the stretcher. The channel 39 may be provided with a locking pin 40 which passes through an orifice in the side wall of the channel and a similar orifice in the horizontal stretcher support member 23. In the embodiment shown in FIG. 12 the pin 40 extends from springed arm 41 which, in its resting position places the pin 40 in the orifice of the channel as shown in FIG. 13.

In use, the stretcher is placed on horizontal stretcher support members 23 so that the channels line up with the support members. The pin 40 is pulled out of the orifice and the channel 39 is seated on the support member 23. When the orifices in the channel and the support member line up the pin 40 enters the orifice locking the stretcher in place. It will be appreciated that other locking mechanisms may be used to lock the stretcher onto the stretcher system.

I claim:

1. A stretcher system comprising:
   a first horizontal stretcher support member having a first end and a first second end and a vertical stretcher support member having a first end and a second end, the first end of said horizontal stretcher support member being removably connected to a wall surface, the second end of said horizontal stretcher support member being connected to the first end of the vertical stretcher support member, the second end of the vertical stretcher support member being removably connected to a floor surface;
   a second horizontal stretcher support member having a first end and a second end and a second vertical stretcher support member having a first end and a second end, the first end of said second horizontal stretcher support member being removably connected to said wall surface the second end of said second horizontal stretcher support member being connected to the first end of the second vertical stretcher support member, the second end of the vertical stretcher support member being removably connected to a floor surface; and a stretcher removably connected to said first and second horizontal stretcher support members and wherein said first horizontal stretcher support member and said first vertical support member are not directly connected to said second horizontal stretcher member and said second vertical support member except when said stretcher is attached to said first and second horizontal stretcher support members.

2. The stretcher system according to claim 1 wherein said second end of each horizontal stretcher support member and each first end of said vertical stretcher support member are hingedly connected such that each of said horizontal stretcher support member and its corresponding vertical stretcher support member may fold together for storage.

3. The stretcher system according to claim 2 wherein first end of each horizontal stretcher support member is rotatably connected to an anchor on said wall.

4. The stretcher system according to claim 3 wherein each said anchor has a stem extending outwardly from said wall surface and wherein said stem ends in at least one finger which mates with at least one finger on the first horizontal stretcher support member.

5. The stretcher system according to claim 4 wherein each finger has a orifice therein and wherein said orifices are adapted to be aligned with each other said orifices being adapted to receive a pin to connect said stem to said first horizontal stretcher support member.

6. The stretcher system of claim 5 wherein said vertical stretcher support member has a disc on said second end.

7. The stretcher system of claim 6 wherein said disc is adapted to be received in an orifice in said floor surface.

8. The stretcher system of claim 7 wherein said floor surface has a strip anchored thereto said strip having a top surface and a bottom surface and having a plurality of orifices in its upper surface each orifice being separated from the other orifices by a pair of opposed flanges which extend inwardly from each side of the strip, said flanges extending inwardly from only a portion of each side of said strip such that there is space in said strip between each pair of opposed flanges and under each flange whereby said disc on said vertical stretcher support member is received by one of said orifices and retained in said strip by said flanges.

9. The stretcher system of claim 1 wherein said stretcher has a channel of a U shaped cross-section on the underside of the stretcher for connecting said stretcher to each of said horizontal stretcher support members.

10. The stretcher system of claim 9 further comprising a locking pin which passes through an orifice in said channel and an orifice in said horizontal stretcher support member.

11. The stretcher system of claim 10 wherein said locking pin extends from a springed arm connected to said channel such that when said springed arm is in a resting position said pin is in the orifice of the channel.

12. The stretcher system of claim 8 wherein said stretcher has a channel of a U shaped cross-section on the underside of the stretcher for connecting said stretcher to each of said horizontal stretcher support members.

13. The stretcher system of claim 8 further comprising a locking pin which passes through an orifice in said channel and an orifice in said horizontal stretcher support member.

14. The stretcher system of claim 8 wherein said locking pin extends from a springed arm connected to said channel such that when said springed arm is in a resting position said pin is in the orifice of the channel.

* * * * *